(No Model.)

A. RECKENZAUN.
DYNAMO ELECTRIC MACHINE AND ELECTRIC MOTOR.

No. 313,884. Patented Mar. 17, 1885.

WITNESSES
Henry F. Parker
Clarence E. Stump

INVENTOR:
Anthony Reckenzaun.
BY W. J. Johnston
ATTORNEY.

UNITED STATES PATENT OFFICE.

ANTHONY RECKENZAUN, OF LONDON, ENGLAND, ASSIGNOR TO FREDERICK RECKENZAUN, OF NEW YORK, N. Y.

DYNAMO-ELECTRIC MACHINE AND ELECTRIC MOTOR.

SPECIFICATION forming part of Letters Patent No. 313,884, dated March 17, 1885.

Application filed March 25, 1884. (No model.)

*To all whom it may concern:*

Be it known that I, ANTHONY RECKENZAUN, a subject of the Queen of Great Britain, residing in London, England, have invented a new and useful Improvement in Dynamo and Magneto Electric Machines and Electric Motors; and I do hereby declare that the following is a full, clear, and exact description thereof, reference being had to the accompanying drawings, forming a part of this specification.

My invention relates to the class of electrical generators and motors in which the form of armature known as the "ring-armature" is used; and it consists, first, in a magnetic core or ring for such armatures, formed of series of links joined to each other by rods or pins passing through eyes near the ends of the links, forming a structure similar to an endless pitch-chain.

It further consists of a field-magnet located within the armature-ring, supported by the armature-shaft and maintained in position by a weight attached to or formed integral with the internal field-magnet.

In electrical machines of this class it is usual to employ for the cores of the armature masses of iron in the form of drums, cylinders, or rings, or of a number of disks or plates, or of wire wound around a hub. Such cores are necessarily heavy, and when revolved in a magnetic field currents are produced within them, generating heat and reducing the efficiency of the machine.

My invention is designed to obviate these defects and to furnish a core of lighter weight with increased efficiency, and at the same time to facilitate winding the armature.

Figure 1:
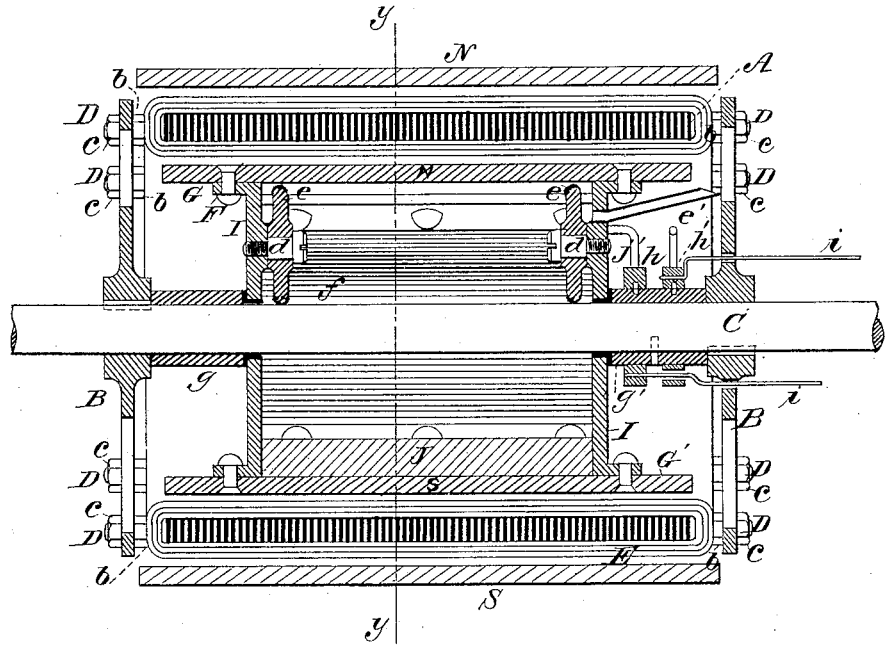
Figure 2:
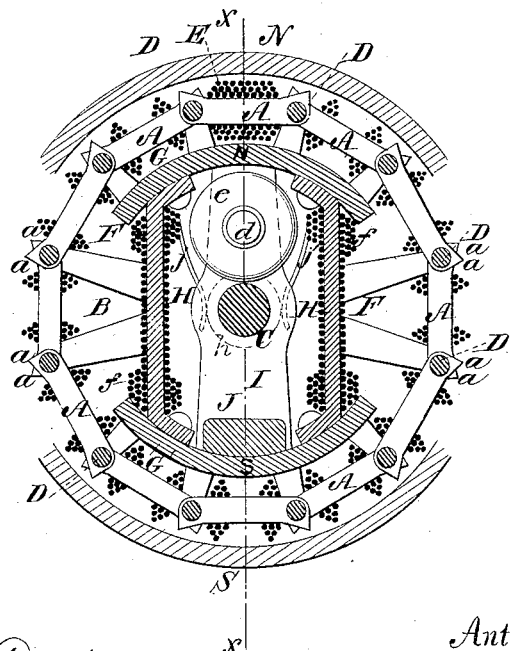

Figure 1 in the drawings is a longitudinal section of the armature and field-magnet, taken on line $x\,x$ in Fig. 2. Fig. 2 is a vertical transverse section taken on line $y\,y$ in Fig. 1.

Like letters of reference refer to the same parts in the two figures of the drawings.

The armature-core is composed of series of links A of magnetic material supported by spiders or heads B, fixed to the shaft C. The links A are oblong in form, with an angular projection, $a$, at each end on the outer side. These angular projections serve two purposes: First, to serve to fill up with iron a space which otherwise would be void. The iron is a part of the armature, which is a magnet, and therefore these projections serve to make the distance between the external field-magnet, N and S, a minimum. It is well known that in electric motors the field-magnets and the armature act as electro-magnets, which when excited by an electric current sent through the machine from an external source attract or repel each other. The armature, being thus attracted at the magnetized parts of its circumference by the external magnet-poles, and being mounted upon a rotating shaft, will consequently turn or tend to turn around its axis, and thereby convert electrical energy into mechanical energy. This mutual attraction or "pull," as it is called, is strongest at those parts of the armature-core which lie nearest to the poles of the external magnet. Therefore, instead of covering the whole surface of the armature with wire, I leave spaces between the bobbins at suitable intervals, into which I place the angular projections of the core-links. These projections I make angular or pointed, for the reason that the magnetic lines of force are more intense at sharp corners or points than on flat surfaces, and consequently the pull exerted upon the armature-core greater than would be the case without this angular projection. Second, the said projections serve also to assist to hold on the armature-coils. Each link is apertured near opposite ends to receive the rods D, by means of which the adjacent series of links are connected together and supported in proper relation to the armature-shaft C and poles N S of the field-magnet. The links A of one series alternate with those of the adjacent series, so that when the several series are connected together by means of the rods D, and clamped together by nuts $b$ on the screw-threaded ends of the rods, the lateral faces of the ends of the links of one series touch the corresponding faces of the links of another series. The ends of the rods D are received in holes in the armature-heads B and secured by nuts $c$. The rods D may be of metal or of insulating material, or they may be made of metal and provided with an insulating-covering.

To facilitate the construction of my armature, I wind each series of links A transversely with the conductor E before coiling the chain of links into a ring. I then form the ring and insert the last rod D to complete the connection and render the ring entire. The terminals of the several coils are connected up according to any of the usual well-known methods.

To strengthen the magnetic field of the armature above described, and in other armatures of the ring class, I place wholly within the said armature an internal field-magnet, F, composed of segments G G', of a hollow cylinder of magnetic material, connecting-plates H, of magnetic material, joined to the inner surface of the segments G G', and heads I, of non-magnetic material. The heads I are fitted to the armature-shaft C, so that the latter may revolve therein. The segments G G' are concentric with the armature-shaft, and the plates H are parallel with the said shaft.

To the inner surface of the lower segment, G', is secured a weight, J, for retaining the internal field-magnet in a vertical position while the machine is stationary, or in an inclined position while the machine is running, and upon studs d, projecting from the inner surface of the heads I, are journaled the rollers e, which rest upon the armature-shaft C and bear the weight of the field-magnet. This internal or supplementary field-magnet may itself be constructed of a series of thin strips linked or bound together by non-magnetic material, like or similar to the structure of the armature-core itself, and it may be provided with suitable bearings, when the rollers may be omitted. Oil is introduced to the journals of the rollers e through inclined tubes e', extending outward from the journals. The plates L are wound in opposite directions with the conductor f, so that the two segments G G' will be of opposite polarity, but similar to the adjacent field-magnet poles. The internal field-magnet, F, is prevented from end movement on the shaft C by two sleeves, g g', placed on the said shaft between the armature-heads B and the internal field-magnet heads, I. The sleeve g', which is of insulating material, is secured to the shaft C, and carries two metallic rings, h h', which are in electrical connection with the commutator-brushes of the machine through the wires i, one ring receiving the positive current, the other the negative current. The rings h h' are touched by contact springs or brushes j j', connected with the terminals of the coils of the internal field-magnet, F. As the armature revolves in the intensified field between the poles of the internal field-magnet and the poles of the external field-magnet, the efficiency of the machine is largely increased, as the internal portion of the conductor of the armature is rendered highly effective in producing the current. The said external field-magnet is represented, as to its poles, in the drawings by N and S, and is represented only in outline, as it may be of any form of electro-magnet desirable without affecting the nature of the invention. The weight in the internal field-magnet causes it to maintain a nearly vertical position while the armature revolves around it. The contact-springs j j' remain stationary with the internal field-magnet, while the rings h h' revolve in contact with them.

In magneto-electric machines and in motors the internal and external field-magnets may consist of permanent magnets.

The internal field-magnet may have two or more poles, as may be required, and its form may be varied to adapt it to different requirements.

The form of the links of which the armature-core is composed is not arbitrary, and may be varied within certain limits without changing the results.

The armature-core is applicable to the hollow armature of any dynamo or magneto electric machine or electric motor, and in dynamo and electric motors the power of the field may be regulated by varying the current passing through the coils of the internal field-magnet or by cutting it off altogether.

The pole-pieces of the internal magnet may be of the same polarity as the armature, or they may be of opposite polarity. In one case the internal magnet will attract and in the other it will repel the armature.

Having thus described my invention, what I claim as new, and desire to secure by Letters Patent, is—

1. An armature-core composed of a number of series of links provided with angular projections and connected by pivoted joints, as herein specified.

2. An armature-core composed of apertured links A, having angular end projections, a, and rods D, passing through the apertures of the said links, as specified.

3. In a dynamo-electric machine or electric motor, a field-magnet located wholly within the armature-core concentric with the armature-shaft C, and balanced or supported upon the shaft by rollers or wheels e, adapted to rotate around axles d, fixed to said internal field-magnet and above the armature-shaft, and by weights J, resting upon or fixed to the internal field-magnet at a point below the armature-shaft, substantially as and for the purpose specified.

4. The combination, with a field-magnet located wholly within the armature and suspended from the armature-shaft, of a weight for maintaining the said internal field-magnet in a vertical position, as specified.

5. The combination, with the internal field-magnet, F, of two friction-rollers or wheels, e, carried by the magnet-heads, bearing on the armature-shaft, and located entirely above the said shaft, and of the counterbalancing-weight J, located upon the said internal field-magnet and below the said armature-shaft, substantially as set forth in the annexed specification.

ANTHONY RECKENZAUN.

Witnesses:
  W. L. BYNE,
*Clerk to Messrs. Sun, Gribble & Bunton, 12 Abchurch Lane, London, Public Notaries.*
  S. G. WARNER,
*Solicitor, 6 Quality Court, Chancery Lane, London.*